United States Patent
Maeda

(10) Patent No.: US 7,359,302 B2
(45) Date of Patent: Apr. 15, 2008

(54) INFORMATION MEDIA, RECORDING AND READING APPARATUS

(75) Inventor: Takeshi Maeda, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 270 days.

(21) Appl. No.: 10/347,801

(22) Filed: Jan. 22, 2003

(65) Prior Publication Data
US 2004/0004926 A1    Jan. 8, 2004

(30) Foreign Application Priority Data
Jul. 3, 2002    (JP)    ............... 2002-195061

(51) Int. Cl.
   *G11B 7/00*    (2006.01)
(52) U.S. Cl. ............... 369/59.12
(58) Field of Classification Search ............... 369/59.11, 369/59.12
See application file for complete search history.

(56) References Cited
U.S. PATENT DOCUMENTS
5,808,988 A * 9/1998 Maeda et al. ............. 369/47.17
5,809,004 A * 9/1998 Kobayashi et al. ....... 369/275.3
6,545,965 B1 * 4/2003 Hayashi .................... 369/59.12

FOREIGN PATENT DOCUMENTS
JP    2002-157734    5/2002

OTHER PUBLICATIONS
Japan Journal of Applied Physics, vol. 35, 1996, pp. 437-442.

* cited by examiner

Primary Examiner—Wayne Young
Assistant Examiner—Lixi Chow
(74) Attorney, Agent, or Firm—Mattingly, Stanger, Malur & Brundidge, PC

(57) ABSTRACT

In a method of recording information by varying the front- and rear-edge positions of a mark by integer multiples of a specific interval, the recording density is increased without narrowing the intervals of edge position variation and without being influenced by the detection dynamic range. A data cell is divided at specific intervals Δ, and the front- and rear-edge positions of the mark are disposed at any desired positions at specific intervals Δ. Thus the mark length and the number of positions the mark can take can be increased, so that the recording density can be increased with the same margin as that of the prior art.

18 Claims, 18 Drawing Sheets

INFORMATION MEDIA, RECORDING AND READING APPARATUS

BACKGROUND OF THE INVENTION

1. Technical Field

The present invention relates to a method and apparatus for recording and reading information on a medium by using changes in optical characteristics. More particularly, the invention relates to optical disk apparatuses.

2. Background Art

A method of increasing the areal density of an optical disc is known from Japan Journal of Applied Physics, Volume 35, 1996, pp.437-442. In this method, called SCIPER (Single Carrier Independent Pit Edge Recording), marks are recorded on the disk surface at equal intervals. These positions of the front and rear edges of each mark are independently varied. The positional changes are measured at specific detection points in the form of changes in multi-levels at a particular detection point to read out the recorded information.

Referring to FIG. 1, the principle of the SCIPER method according to the prior art will be described. Groups of prepits 102 to 107 are formed along a track center 101 on the disc surface. Each group includes a pair of prepits 103 and 104 or a pair of prepits 105 and 106, each prepit being disposed on either side of the track center 101, for detecting a tracking signal. It also includes prepits 102 and 107 disposed at the track center for providing a clock. A data recording area, or data block, is disposed between the groups of prepits. The data block is further divided into a plurality of data cells 108 with a length P. Each data cell contains a mark 110, 111, 112. The mark is modulated by moving its front and rear edges forward or backward from a specific center position by distances which are integer multiples of a specific interval $\Delta$, such that the edge positions represent information.

A minimum mark length Lmin of a mark formed is chosen such that when reading the recorded information by means of a reading spot 109, a readout signal picked up from the front edge is not influenced by the rear edge, i.e., such that there is no interference between the front and rear edges. A maximum mark length Lmax is selected such that the gap between the maximum-length mark in a data cell and the maximum-length mark in an adjacent data cell is equal to the minimum mark length Lmin, so that the signals from the front and rear, or the rear and front, edges of the two marks do not interfere with each other. User data is associated with a number $(n+1)\times(n+1)$ of combinations of edge positions, where n is the number of divisions of the position that each of the front and rear edges can take in units of interval $\Delta$. In order to increase the recording density, the number of divisions n in units of interval $\Delta$ has to be increased.

FIG. 2 illustrates how the information stored at the front and rear edges of a mark is read. When the edge positions are not shifted, that is during non-modulation, the mark has its front edge positioned at 201 and rear edge at 202, with a mark length of Lo. The front edge position is varied independently based on its center at position 201 by an integer multiple of an interval $\Delta$, and so does the rear edge position, based on its center at position 202. As a result, the mark length varies between the minimum mark length Lmin and the maximum mark length Lmax. When reading the information retained by the edge positions, a shift value in the edge positions is detected by observing a readout signal waveform at timings corresponding to both edges of the mark. Specifically, the levels of a readout signal waveform 409 are measured at timings of the edges 201 and 202 of non-modulated data, so that the positions of the front and rear edges can be detected by converting them into multi-levels.

In the method of recording information by varying the positions of the front and rear edges of a mark by integer multiples of specific interval $\Delta$, if the edge-position variation interval $\Delta$ is narrowed in an attempt to increase areal density, stricter control precision at recording would be required and there would be less detection margin for the detection of readout signal multi-levels. Furthermore, if the number n of variations is increased while the edge-position variation interval $\Delta$ is fixed, the readout signal levels at both edges of non-nodulation data could be saturated or become zero and, as a result, the edge positions could not be detected beyond the dynamic range, making it difficult to increase areal density.

SUMMARY OF THE INVENTION

It is an object of the present invention to provide, in an information recording method whereby information is recorded by varying the positions of the front and rear edges of a mark by integer multiples of a specific interval, a method of increasing areal density without narrowing the edge-position variation interval nor suffering from the influence of detection dynamic range.

In accordance with the invention, a track is divided into data cells at equal intervals. Each data cell is further divided at specific intervals $\Delta$ and contains a mark. The front and rear edges of the mark are located at a front part and a rear part, respectively, of their respective divided positions. A minimum interval between the front edge and the rear edge, that is the length of a minimum mark, is Lmin which does not cause interference between edges. In the present invention, the length of a mark which varies between the minimum mark length Lmin and the maximum mark length Lmax and the mark's position in the data cell are made to correspond to information. For this purpose, the front-edge and rear-edge positions are varied at intervals $\Delta$ within the data cell such that the front and rear edge positions correspond to information.

FIG. 3, which corresponds to the prior art of FIG. 2, illustrates how the information stored in a mark is read according to the invention. The mark according to the prior art of FIG. 2 had to be disposed such that the mark incorporated the minimum mark length Lmin in the data cell. Namely, in FIG. 2, the position of the minimum mark with length Lmin is fixed in the data cell and it cannot take any other positions in the data cell. Further, the front-edge of each mark is not allowed to take any positions to the right of the front edge position 203 of the minimum mark, nor is the rear-edge position allowed to take any positions to the left of the rear-edge position 204 of the minimum mark. In contrast, there is no such positional limitations in the mark according to the invention, and even the minimum mark with length Lmin can take various positions in the data cell. Thus, in accordance with the invention, marks 205 and 206 that would have been impossible in the prior art can exist as shown in FIG. 3, allowing the number of possible marks to increase. The invention also enables the number of readout signals 409 to increase as the number of possible marks increases.

FIG. 4 illustrates the number of items of information that can be expressed by combinations of mark length and edge positions. The number of combinations of the front- and rear-edge positions according to the invention will be hereafter determined by referring to FIG. 4. When the minimum mark length Lmin is m times a specific interval Δ, the maximum mark length Lmax is m+2n times Δ where n is the number of variations. As the maximum mark length becomes shorter from its front edge one specific interval at a time, the number of positions that can be taken by the rear edge is determined as shown in FIG. 4. The number T1 of all positions can be determined by the following equation:

$$T1 = \sum_{k=1}^{2n+1} k = \frac{1}{2}(2n+2)(2n+1) = (n+1)(2n+1) \quad (1)$$

The number T2 of positions that can be taken by the front and rear edges according to the prior art is T2=(n+1)×(n+1). The ratio of density improvement over the prior art can be determined by the following equation:

$$\frac{T1}{T2} = \frac{(n+1)(2n+1)}{(n+1)(n+1)} = \frac{(2n+1)}{(n+1)} \quad (2)$$

Thus, as will be seen from FIG. 5, as the value of n increases, the density increases infinitely close to twice the density obtained in the prior art.

When detecting a mark, a sampling clock synchronized with the specific intervals is created. A readout waveform in the data cell is sampled using the sampling clock and stored in a memory. By measuring changes in the waveform and their levels, the front- and rear-edge positions are detected. As the recording takes place with the same degree of precision based on the specific intervals Δ as in the prior art, the recording margin is also the same. Further, the amount of change in the readout signal level in response to a change in an edge when the mark is read is the same as that in the prior art. Thus, the reading margin during detection of edge positions can also be the same as in the prior art.

In one aspect, the invention provides an information recording medium comprising marks formed in a data recording area provided along tracks, the marks storing data, wherein the data recording area comprises a plurality of data cells each having a mark formed therein, wherein data is represented by a pair of front- and rear-edge positions of the mark in each data cell.

The data cell may be divided into a plurality of partial areas with a predetermined length in the direction of the tracks, wherein the front- and rear-edge positions are varied in units of the predetermined length. The mark may have different optical characteristics from those of the other parts within the data cell. There may be multiple combinations of the front- and rear-edge positions based on a mark having a minimum mark length.

In another aspect, the invention provides an information recording medium comprising marks formed in a data recording area provided along tracks, the marks storing data, wherein the data recording area comprises a plurality of data cells each having a mark formed therein, wherein information is represented by a pair of the position and length of the mark in each data cell. The position of the mark in a data cell may be defined by the position of its front edge, rear edge, and/or center (intermediate point between the front- and rear-end positions).

The data cell may be divided into a plurality of partial areas with a predetermined length in the direction of the tracks, wherein the length of the mark is varied in units of the predetermined length. The mark may have different optical characteristics from those of the other parts within the data cell. Furthermore, there may be multiple mark positions in the data cell with respect to a mark with a minimum mark length.

In yet another aspect, the invention provides an information recording apparatus for recording data in a disc recording medium by forming a mark in each of a plurality of data cells provided along tracks on the disc recording medium, the apparatus comprising:

a light source;

optics for forming a small spot on the surface of the recording medium by converging a light flux irradiated by the light source;

an encoder for converting user data into a pair of the front- and rear-edge positions of the mark formed in each data cell;

a modulator for generating a write waveform based on the information about the front- and rear-edge positions outputted by the encoder; and a laser drive circuit for driving the light source in accordance with the write waveform outputted by the modulator.

The encoder may comprise:

means for generating a pulse signal by using a clock signal which is generated in accordance with the rotation of the disc recording medium at such timings that the data cell is divided into a predetermined number of areas at equal intervals in the direction of the tracks, the pulse signal rising at the front-edge position and falling at the rear-edge position; and means for generating the write waveform based on the pulse signal.

In another aspect, the invention provides an information reading apparatus for reading information from a disc information recording medium by detecting a mark formed in each of a plurality of data cells provided along the tracks of the disc information recording medium, the apparatus comprising:

optics for irradiating the disc recording medium with an optical spot;

a photodetector for detecting light reflected by the disc recording medium;

a front/rear edge detection block for detecting the front- and rear-edge positions of the mark in each data cell by processing a readout signal outputted by the photodetector; and a decoder for converting a pair of the front- and rear-edge positions of the mark into user data.

The front/rear edge detection block may comprise:

a data cell signal generating circuit for generating a data cell signal indicating the start point of each data cell;

a sample signal generating circuit for generating a sample signal at a plurality of predetermined timings based on the data cell signal;

a memory for storing the readout signal sampled by the sample signal; and a front/rear edge detection circuit for detecting a front edge position by determining a sampling point where the readout signal stored in the memory is closest to a predetermined level in an increase phase in which the readout signal increases with time, and detecting a rear edge position by determining another sampling point where the readout signal stored in the memory is closest to the predetermined level in a decrease phase in which the readout signal decreases with time. The sample signal generating circuit preferably generates the sample signal at such timings that the data cell is divided into a predetermined number of areas at intervals of edge position variation of the mark in the direction of the tracks. The predetermined level may be equal to the half-value level of the readout signal.

The front/rear edge detection block may comprise:

a data cell signal generating circuit for generating a data cell signal indicating the start point of each data cell;

means for generating a pulse signal by comparing the readout signal with a set value, the pulse signal rising at the front edge of the mark and falling at the rear edge of the mark;

means for detecting the front-edge position by counting the time between the generation of the data cell signal and the rise of the pulse signal; and means for detecting the rear-edge position by counting the time between the generation of the data cell signal and the fall of the pulse signal.

The front/rear edge detection block may further comprise:

a data cell signal generating circuit for generating a data cell signal indicating the start point of each data cell;

a circuit for generating a sample signal at a plurality of predetermined timings based on the data cell signal;

a table storing the relationship between the readout-signal intensity and the front- or rear-edge position for each sample signal;

means for outputting a corresponding front-edge position by referring to the table when the readout signal sampled by the sample signal is within a predetermined intensity range in a phase in which the readout signal increases with time; and means for outputting a corresponding rear-edge position by referring to the table when the readout signal sampled by the sample signal is within the predetermined intensity range in a phase in which the readout signal decreases with time. The predetermined intensity range of the readout signal may be such that the readout signal and the edge positions exhibit a linear relationship. The sample signal timings may be such that readout signals sampled by any two adjacent sample signals are within the predetermined intensity range.

DETAILED DESCRIPTION OF PREFERRED EMBODIMENTS

Figure 1:
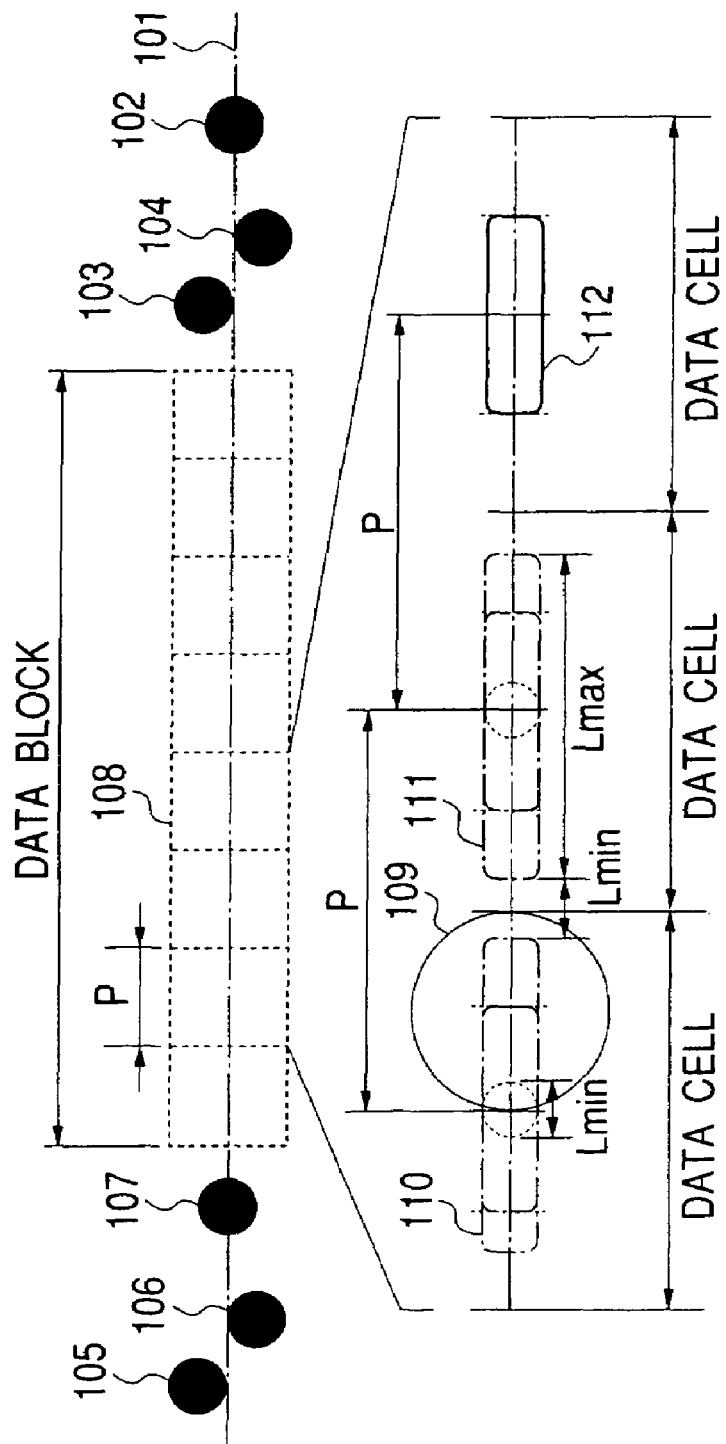
FIG. 1 illustrates the principle of the SCIPER method.
Figure 2:
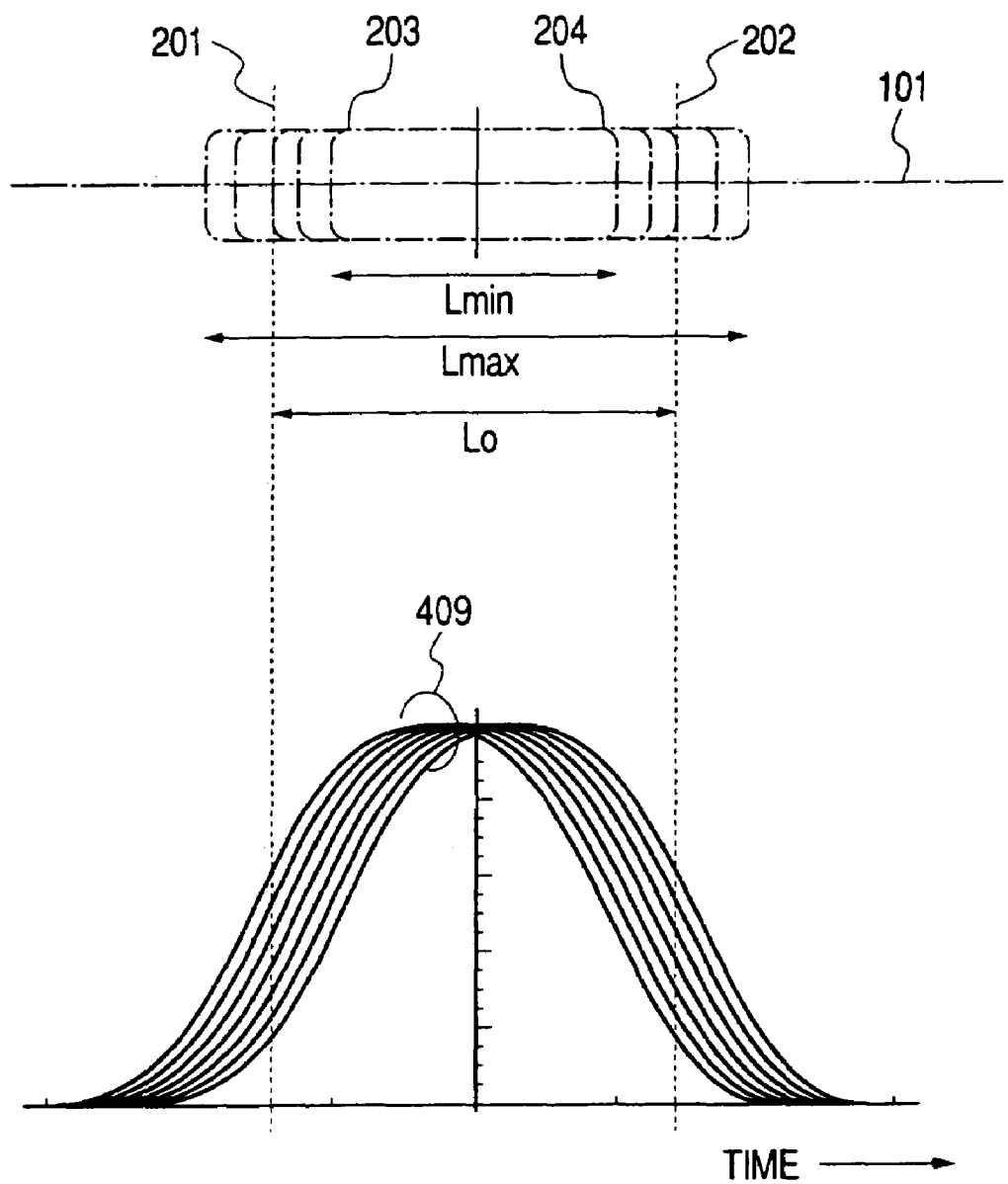
FIG. 2 illustrates the reading of information retained at the front and rear edge positions of a mark.
Figure 3:
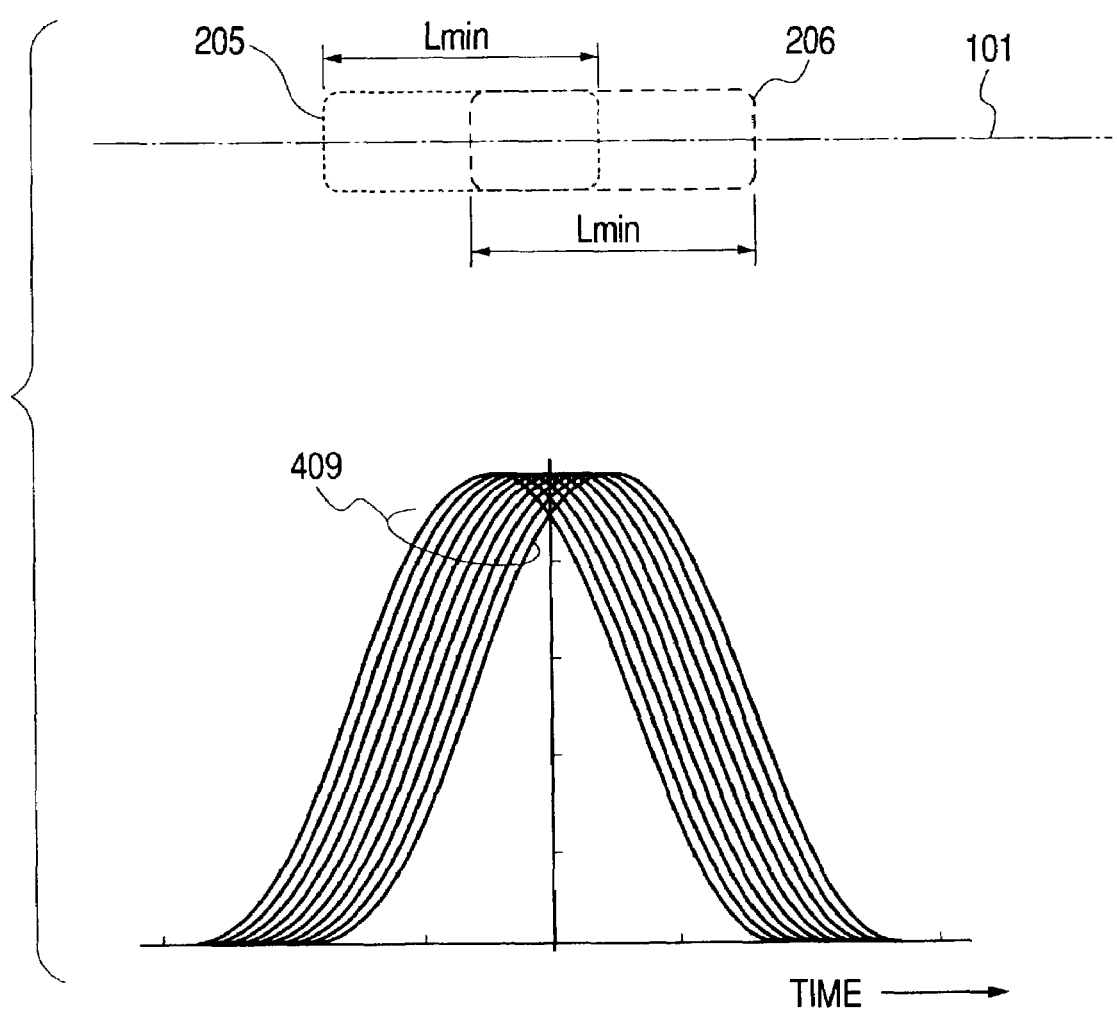
FIG. 3 illustrates the reading of information by means of a mark according to the invention.
Figure 4:
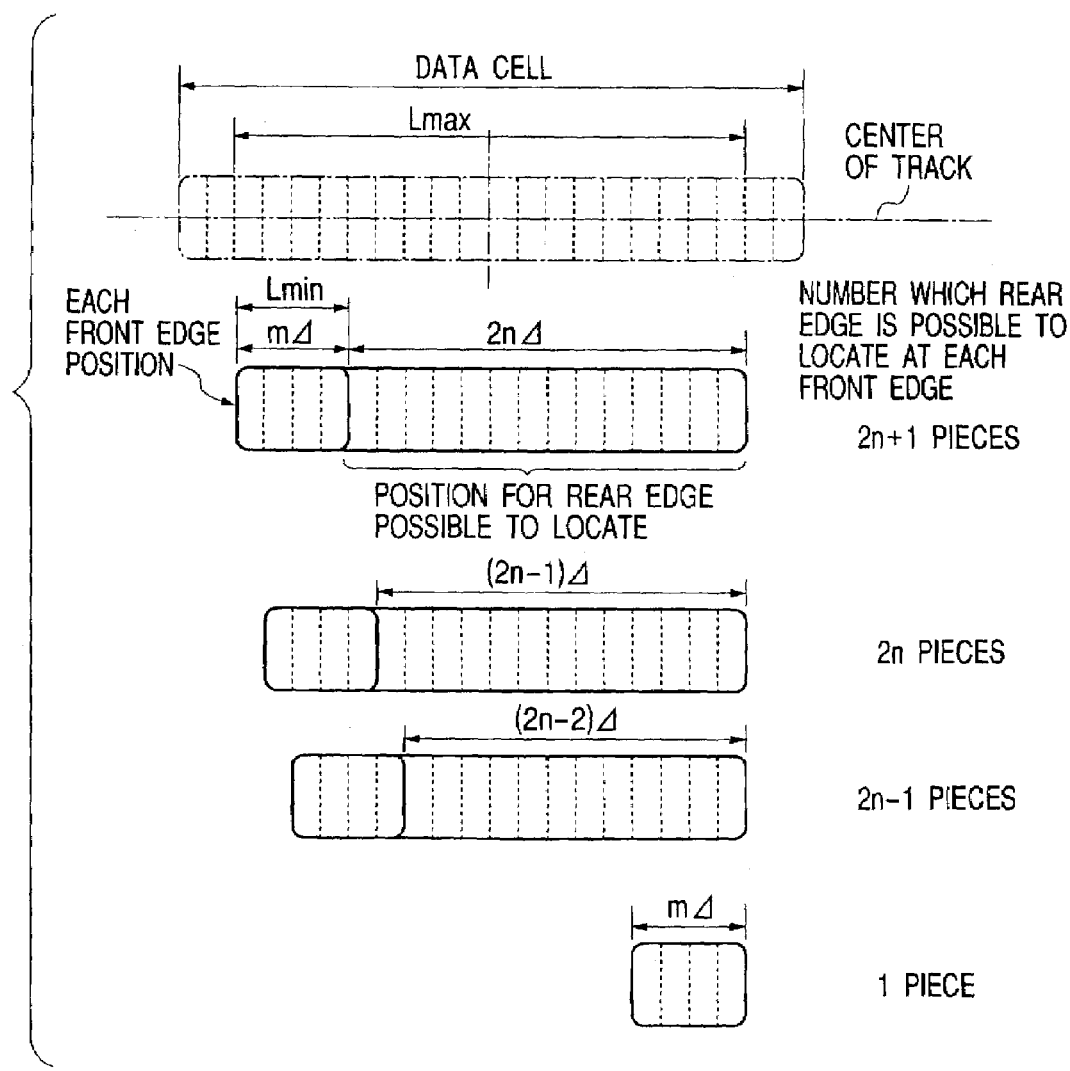
FIG. 4 illustrates the number of items of information that can be expressed by combinations of mark length and edge positions.
Figure 5:
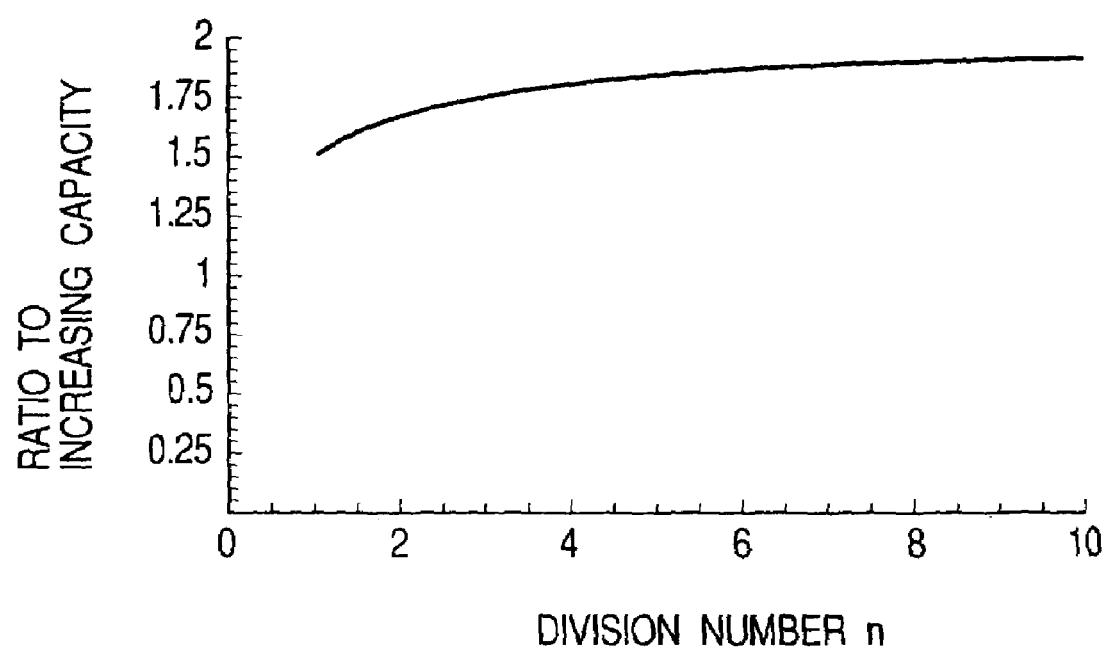
FIG. 5 shows the ratio of density improvement by the method of the invention as compared to a conventional method.

The present invention will be hereafter described by way of embodiments with reference made to the attached drawings, in which like reference numerals identify similar functional elements.

Figure 6:
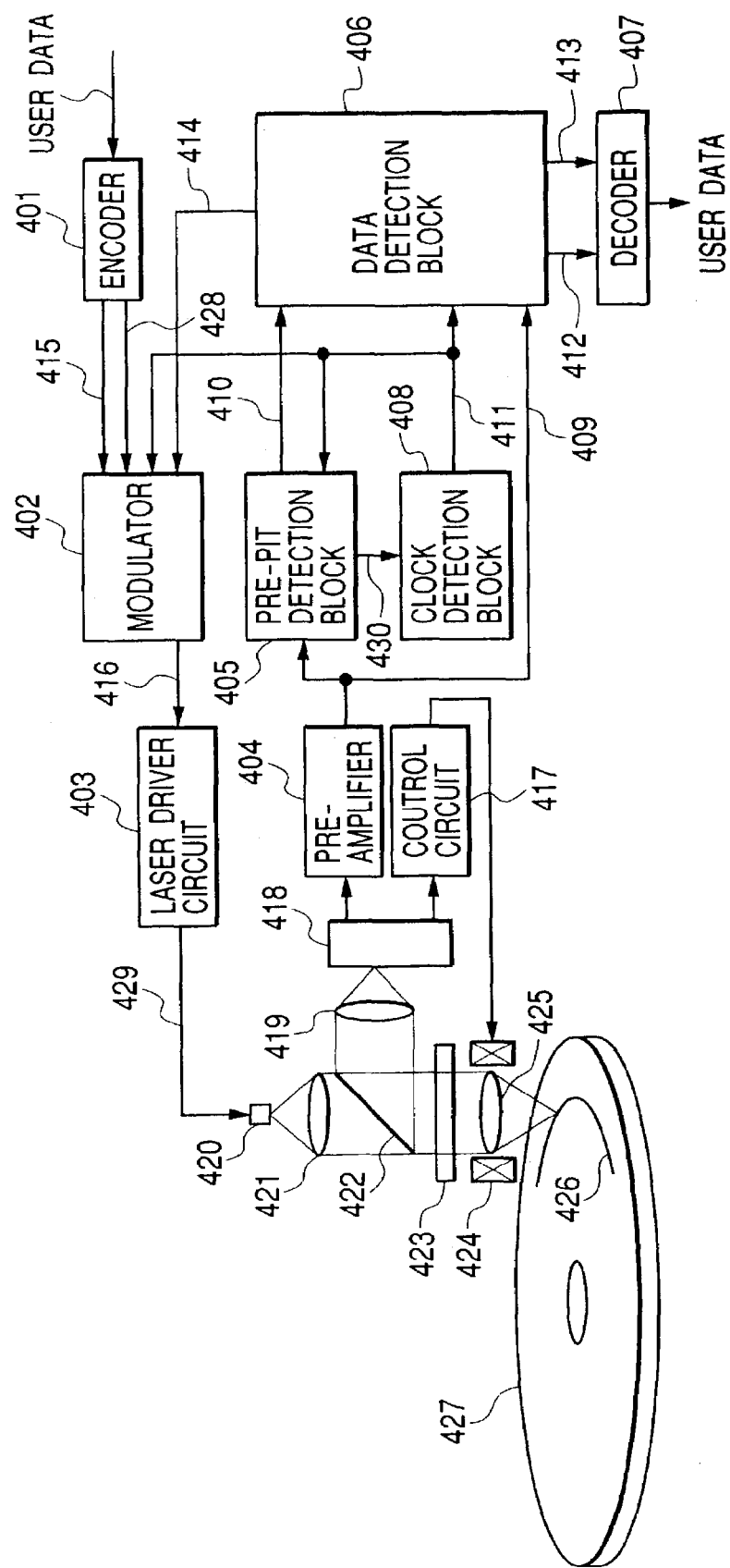
FIG. 6 shows a diagram of an optical information recording and reading apparatus according to the invention.
Figure 7:
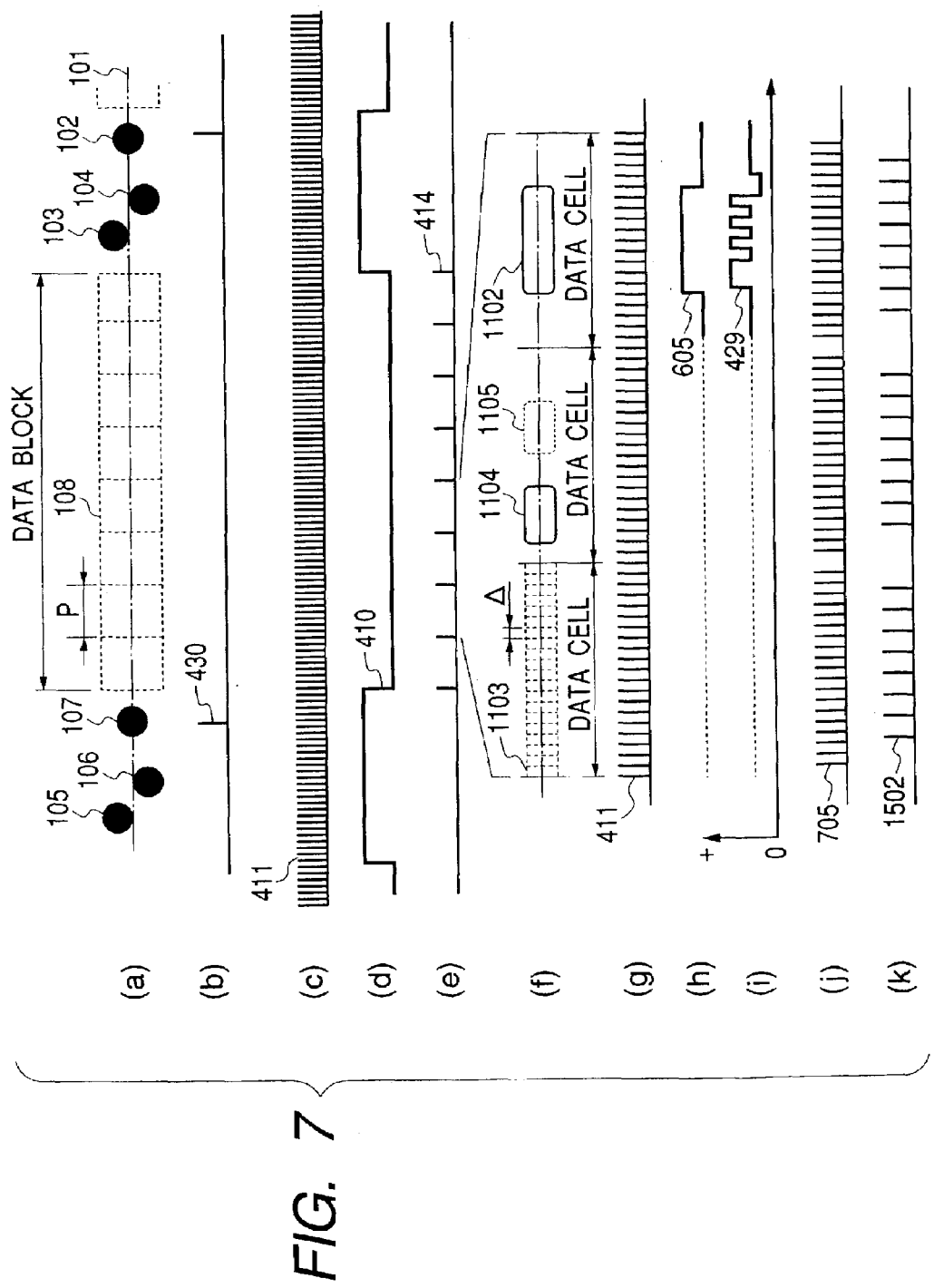
FIGS. 7(a) to 7(k) show a timing chart for the explanation of the operation of the invention.

A first embodiment of the invention will be described by referring to FIGS. 6 to 13. FIG. 6 shows a block diagram of an optical information recording and reading apparatus according to the invention.

Light emitted by a semiconductor laser 420 is collimated into parallel light by a collimator lens 421. The parallel light passes through a polarized beam splitter 422 and further through a ¼-wavelength plate 423, whereby the linear polarized light is converted into circular polarized light. The circular polarized light is focused on a rotating disk recording medium 427 by an object lens 425, forming a minute spot thereon. Light reflected by the recording medium 427 passes through the object lens 425 again and further through the ¼-wavelength plate 423, whereby the light is converted into linear polarized light with its direction of polarization rotated by 90 degrees based on the incident light. The linear polarized light has its optical path bent by the polarized beam splitter 422 and is thereafter converged by a lens 419 onto a photodetector 418. The optical path is separated by optical functional devices (not shown) in the photodetector 418. The reflected light is therefore guided to a detector for generating an error signal which is used in positioning of the light spot, tracking and auto-focusing, for example, and to another detector for generating a readout signal for detecting data. Based on the error signal, a control circuit 417 generates, in a conventional manner, a control signal for tracking and focusing, by which a two-dimensional actuator 424 is driven such that the light spot is positioned in an optimal state for recording and reading.

In the detector which generates the readout signal, the reflected beam of light passing through the objective lens 425 is received and photoelectrically transferred into an electric signal by a photodetector. After amplification in a pre-amplifier 404, the electric signal is sent to a prepit detector 405 for detecting groups of prepits that are provided on a track 426 on the recording medium in advance, to a clock signal detector 408 for detecting a clock signal from clock pits provided on the track in advance, and to a data detector 406. An edge position signal detected by the data detector 406 is decoded by a decoder 407 and outputted as user data.

When user data is recorded, it is first input to an encoder 401 where the data is converted into information about the positions of front and rear edges. The front- and rear-edge position information 415, 428 is fed to a modulator 402 to which a prepit portion detection signal 414 and a clock detection signal 411 are also fed. The modulator 402 creates a modulated pulse 416 corresponding to a mark to be recorded in a data cell on a track, thus converting the user data into a waveform 416 which is actually recorded. The waveform 416 is input to a laser drive circuit 403 by which the laser light source is current-modulated, so that the light intensity of the semiconductor laser 420 can be varied.

On the disc surface, the position of the light spot is controlled to follow a track center 101 such that marks are formed in data cells. Each mark consists of a marked portion and a non-marked portion having different optical characteristics. A minimum mark length Lmin of the formed mark is chosen such that when the mark is read by the reading spot 109, a readout signal from its front edge is not influenced by its rear edge, namely there is no interference from the rear edge. The shortest distance between two marks formed in adjacent data cells is also set at Lmin.

Now referring to the timing chart of FIGS. 7(a) to 7(k), the operation of the apparatus at its individual portions will be described.

FIG. 7(a) shows the positional relationship among groups of prepits 102, 103, 104, 105, 106 and 107, a data block, and data cells 108 (enclosed by dotted line) provided in the block, on the disc surface. FIG. 7(b), corresponding to FIG. 7(a), shows a clock pit signal 430 created from the clock pit 102, 107 in the groups of prepits. The clock pit signal 430 may be detected by a conventional manner using a sampled servo technique. FIG. 7(c) shows a clock signal 411 created from the clock pit signal 430. For this, a conventional PLL (phase-locked loop) may be used. FIG. 7(d) shows a prepit signal 410 indicating the groups of prepits. The prepit signal is created by using the clock signal 411 and the readout signal 409.

FIG. 7(e) shows the timing of a data cell signal 414 created from the prepit signal 410 and clock signal 411. The data cell signal 414 indicates break points of data cells. FIG. 7(f) illustrates the position of marks in three data cells. As the spot is transported over the disc surface at a constant velocity, the figure (f), (g), (h), (i), (j) and (k) are enlarged on the time axis the part of which the data block is depicted in FIG. 7(b), (c), (d) and (e). An area 1103 indicated by dotted line in the first data cell indicates a unit of area that a mark can occupy on a track at intervals Δ. A mark 1104, 1105 in the second data cell indicates an example of the mark that can be recorded according to the invention. The mark 1104 indicates the case where a mark edge is positioned at the farthest edge of the data cell. The mark 1105 corresponds to a conventional example. The third data cell shows a mark 1102 recorded by a write waveform 429, which will be described later. In accordance with the invention, each data cell has one mark. FIG. 7(g) shows a clock signal 411 with an expanded time axis.

FIG. 7(h) shows a modulated data waveform 605 corresponding to the mark 1102. FIG. 7(i) shows the write waveform 429, which is created from the modulated data waveform 605, for recording the mark 1102. FIG. 7(j) shows the timing of a sample clock 705 having a period corresponding to specific interval Δ. The sample clock 705 is used for reading the marks in the data cells. FIG. 7(k) shows a sample pulse 1502 which is used in another embodiment of the invention. Hereafter, the operation of each block of FIG. 6 will be described in detail.

Figure 8:
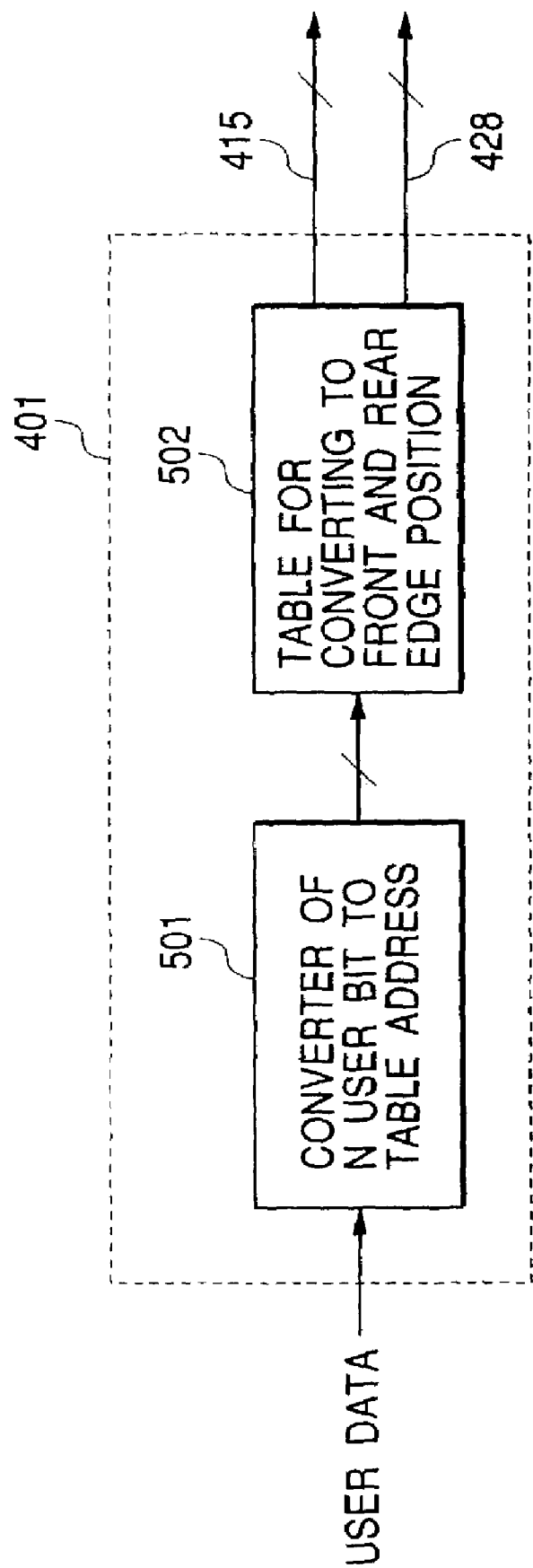
FIG. 8 shows a block diagram of an encoder.

FIG. 8 shows the block diagram of an example of the encoder 401. In the encoder 401, N-bit user data is converted by an address converter 501 into addresses for a converting table that will be described later. The addresses are fed to a table 502 where the addresses are converted into front- and rear-edge positions in each data block. The table 502 thus outputs data 415 and 428 for the front- and rear-edge positions, respectively.

Figure 9:
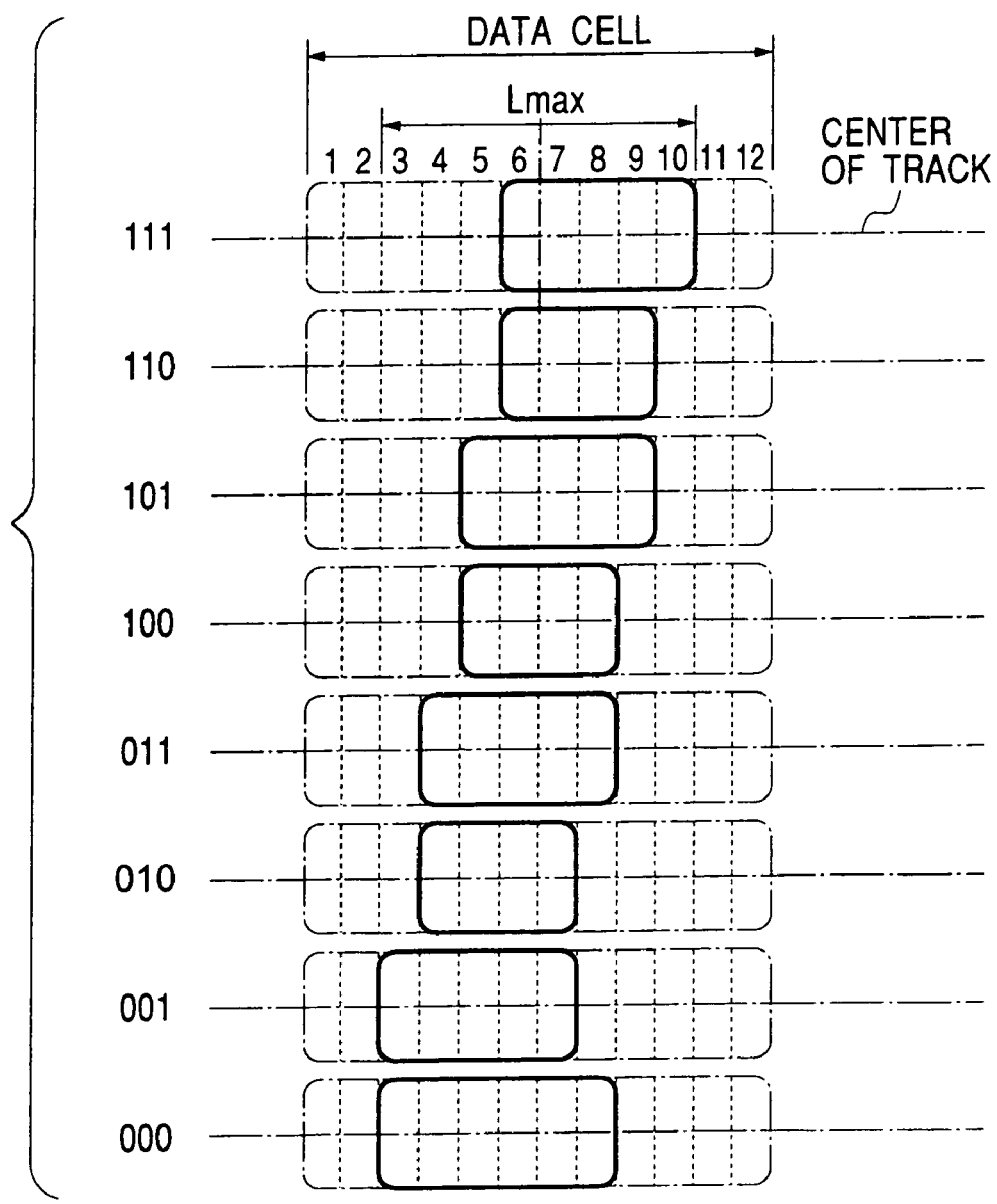
FIG. 9 shows a table for converting user data into front- and rear-edge positions.

An example of the converting table 502 will be described by referring to FIG. 9 and Table 1 shown below. In this example, user data is represented by three bits, which can represent eight items of information. Thus, it is only necessary that eight combinations of mark lengths and mark edges can be recorded in a data cell. As the number n of positions that can be occupied by each of a front edge and a rear edge is varied, the number of combinations of the mark lengths and mark edges that can be represented varies. When n=1, the number T1 of possible combinations is six. When n=2, the number is 15. Accordingly, in order to represent the eight items of information represented by the three user bits, n must be at least two.

Supposing now that Lmin is four times the specific interval Δ, the length of a data cell P, which is Lmin+Lmax, is 12 times the specific interval Δ. Thus, the data cell is divided into 12 areas at intervals Δ, and each area is given a number from one to 12, as shown. For each item of user data, a combination of the number of the data cell area corresponding to the front edge of the mark and the number of the data cell area corresponding to the rear edge of the mark is created and tabulated, as shown in Table 1. Either the front- or rear-edge area numbers of adjacent user data items are made identical so that, should a detection error arise, user bit error after decoding can be minimized. As shown in Table 1, each item of user data is associated with a pair of front-edge position and rear-edge position. In the prior art, the minimum mark is positioned at the center of a data cell without fail, with the front- and rear-edge positions being varied symmetrically. In the present invention, however, the edge of a minimum mark may correspond to the edge position that can be occupied by a maximum mark.

TABLE 1

| User bits | Area number | |
|---|---|---|
| | Front edge | Rear edge |
| 111 | 6 | 10 |
| 110 | 6 | 9 |
| 101 | 5 | 9 |
| 100 | 5 | 8 |
| 011 | 4 | 8 |
| 010 | 4 | 7 |
| 001 | 3 | 7 |
| 000 | 3 | 8 |

Figure 10:
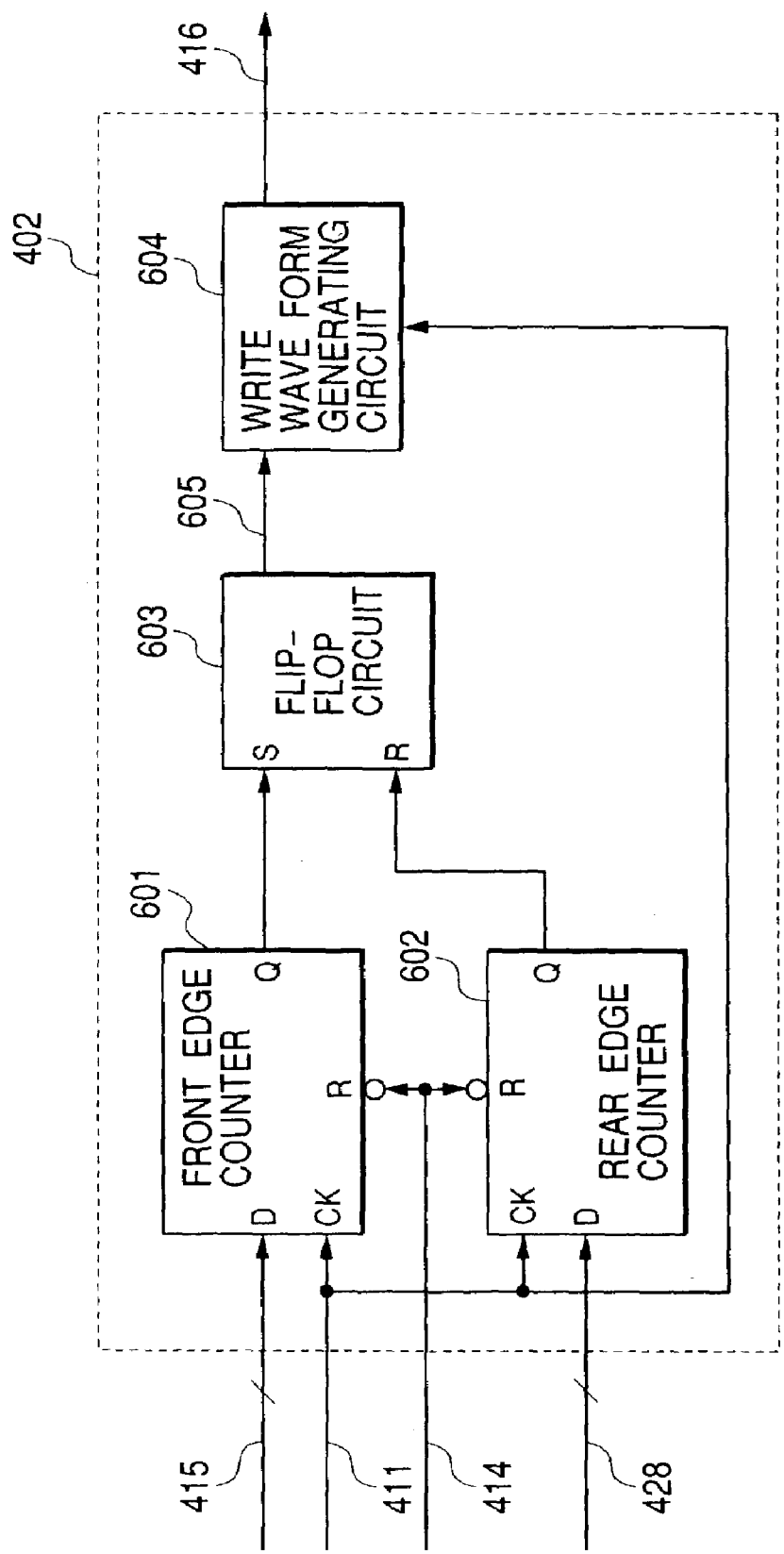
FIG. 10 shows a block diagram of a modulator.

FIG. 10 shows the block diagram of an example of the modulator 402. Data 415 for the front-edge position and data 428 for the rear-edge position are supplied to a data set terminal D of each of a front-edge counter 601 and a rear-edge counter 602. The counters count down in accordance with the clock 411, which is synchronized with the intervals Δ, and output an output pulse from respective output terminals Q when they count down to zero. The counters are reset by the data cell signal 414, which is generated at the break points of the data cells. The output of the front-edge counter 601 is supplied to a set terminal S of a flip-flop circuit 603, while the output of the rear-edge counter 602 is fed to a reset terminal R of the flip-flop circuit 603. An output signal 605 from the flip-flop circuit 603 is a pulse signal which rises at the front-edge position and falls at the rear-edge position. It is known that if this waveform is recorded on an optical disc as is, the marks that are formed would have a teardrop shape. Various techniques are known to solve this problem, for example by converting the pulse into multiple pulses or into multiple levels. In the present embodiment of the invention, the pulse signal is converted by a write waveform forming circuit 604 into a waveform 416 that is actually recorded.

Figure 11:
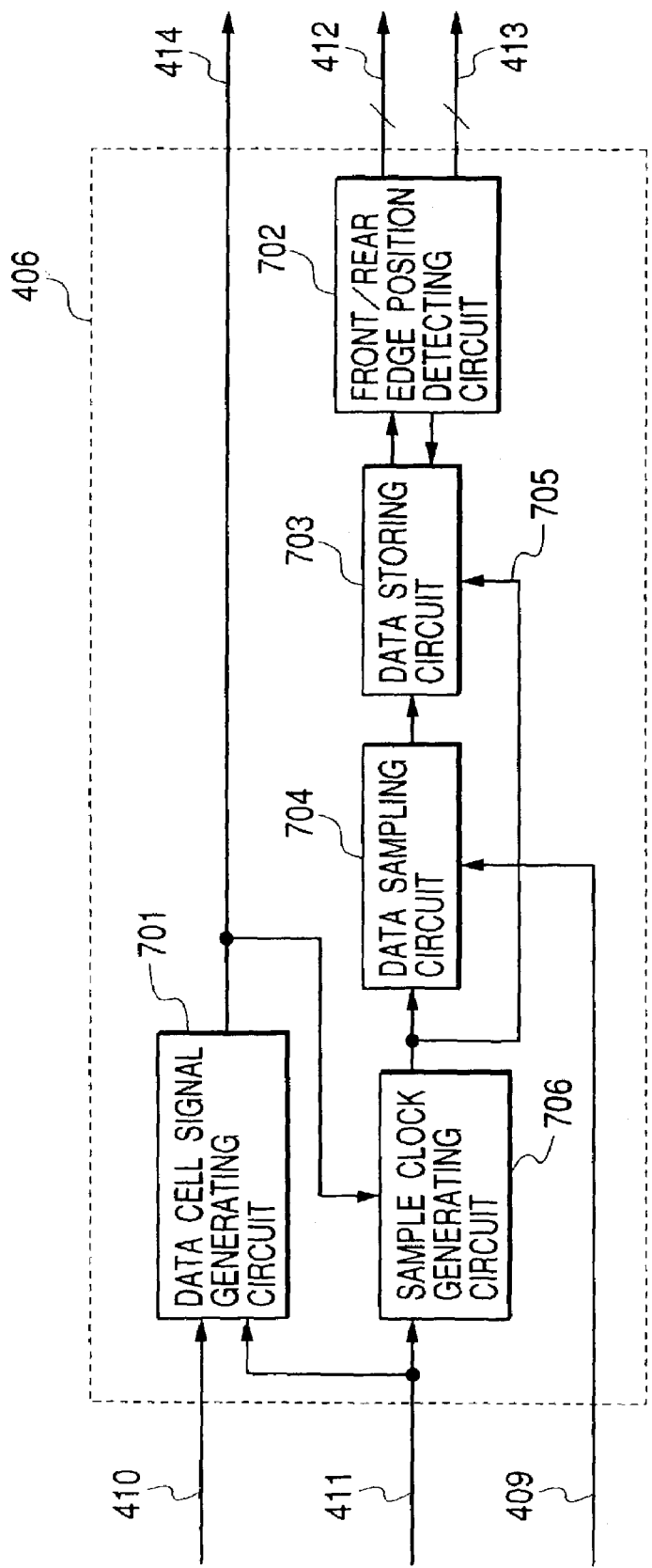
FIG. 11 shows a block diagram of a data detector.

FIG. 11 shows the block diagram of an example of the data detector 406. The data cell signal 414, which indicates break points in the data cells, is generated in a data cell signal generation circuit 701 based on the prepit signal 410, which indicates the interval in which a group of prepits exists, and the clock signal 411. The data cell signal 414 and clock signal 411 are supplied to a sample clock generating circuit 706 which creates a sample clock 705 corresponding to the specific intervals Δ. The sample clock 705 is supplied to a data sampling circuit 704, where the readout signal 409 is sampled by the sample clock 705. Sampled values are stored in a data storage circuit 703 in accordance with the sample clock 705. The stored sampled data is read by a front/rear edge position detecting circuit 702. The front- and rear-edge positions can be determined by a processing in the front/rear edge position detecting circuit 702. In the present embodiment, the edge is detected by taking advantage of the fact that, since there is no interference, the timing of a half-value level of the amplitude of the detected signal which is normalized by the amplitude's maximum value Vo corresponds to the edge position.

Figure 12:
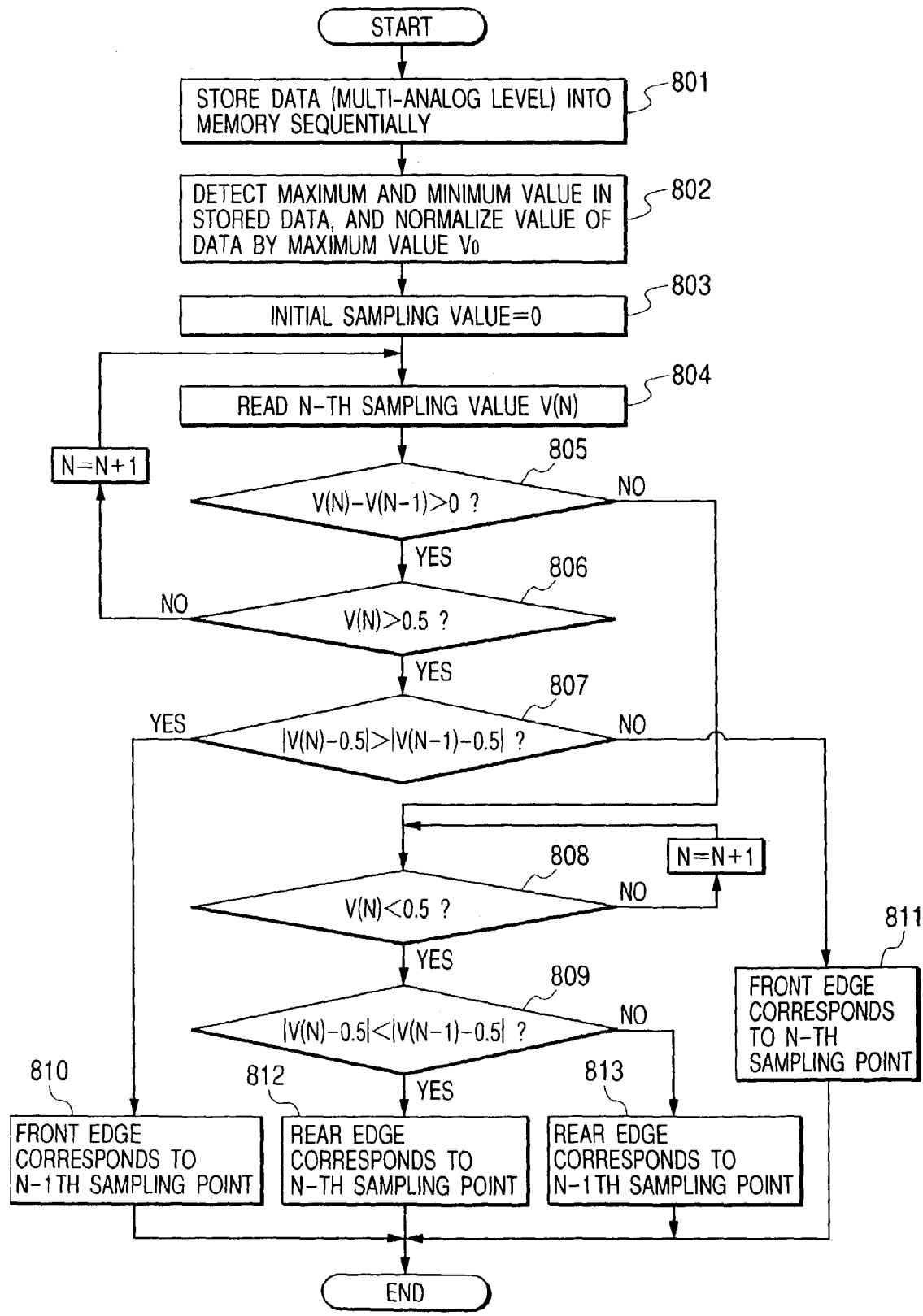
FIG. 12 shows a flowchart of the processes performed in the data detector.

FIG. 12 shows a flow chart of the process performed in the data detector 406.

The process starts when the data cell signal 414 is fed from the data cell signal generating circuit 701 to the sample clock generating circuit 706. In step 801, the data sample circuit 704 samples the readout signal 409 of the data cell according to the sample clock 705 and sequentially stores a sampled signal in the data storage circuit 703. After storage is complete, the process goes to step 802 where maximum and minimum values in the data cell are determined, a maximum amplitude Vo is detected, and the readout signal is normalized by using the value of Vo. In step 803, the initial value in the counters for counting sampling points is set to zero.

In step 804, a sample value V(N) of a number corresponding to the value N indicated by the counter is read. In step 805, the magnitude of the Nth sampling value V(N) is compared with that of an N−1th sampling value V(N−1). If the N−1th sampling value is larger, this indicates that the waveform is falling, so the process goes to step 808. If the Nth sampling value is larger, this indicates that the waveform is rising, so the process goes to step 806, where it is determined whether the Nth sampling value exceeds the half-value level. If not, N is incremented and the process goes back to step 804 where the Nth signal is read. If the half-value level is exceeded, the process goes to step 807 to determine which of the Nth sampling value and the N−1th sampling value is closer to the half-value level. If the N−1th sampling value V(N−1) is closer to the half-value, the process goes to step 810 to output a decision that the front-edge position is at the N−1th sampling point. If, on the other hand, the Nth sampling value V(N) is closer to the half-value, the process goes to step 811 and a judgment is given that the front edge is positioned at the Nth sampling point.

In step 808, it is determined whether the falling signal has further dropped below the half-value. If not, N is incremented and step 808 is repeated. If the sampling value V(N) is below the half-value, the process goes to step 809. In step 809, it is determined which of the Nth sampling value V(N) and the N−1th sampling value V(N−1) is closer to the half-value, and the rear-edge position is judged to be located at the sampling point of the value closer to the half-value. Namely, if the Nth sampling value is closer to the half-value, the process goes to step 812 and a decision is given that the rear-edge is positioned at the Nth sampling position. If the N−1th sampling value is closer to the half-value, the process goes to step 813 to give a judgment that the rear edge is positioned at the N−1th sampling point.

Figure 13:
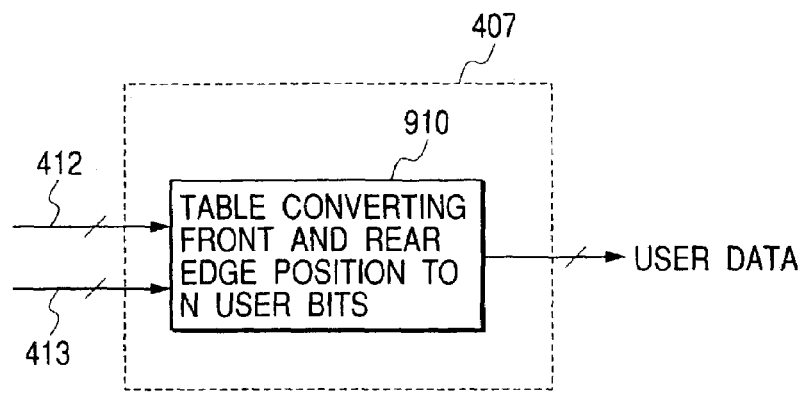
FIG. 13 shows a block diagram of a demodulator.

The detected front- and rear-edge position data 412, 413 is fed to the decoder 407, whose example is shown in FIG. 13. In the decoder 407, the edge position data is converted into N user bits by a table 910 that outputs corresponding user data. The table 910 is similar to Table 1 but carries out an opposite conversion, associating pairs of the front- and rear-edge positions with the user data.

Figure 14:
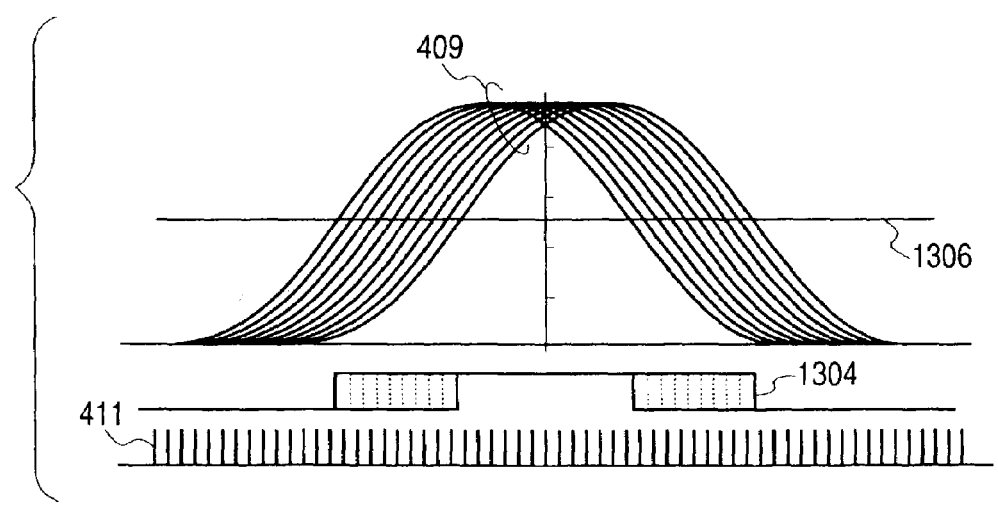
FIG. 14 illustrates the relationship between a readout signal and an edge detection signal.
Figure 15:
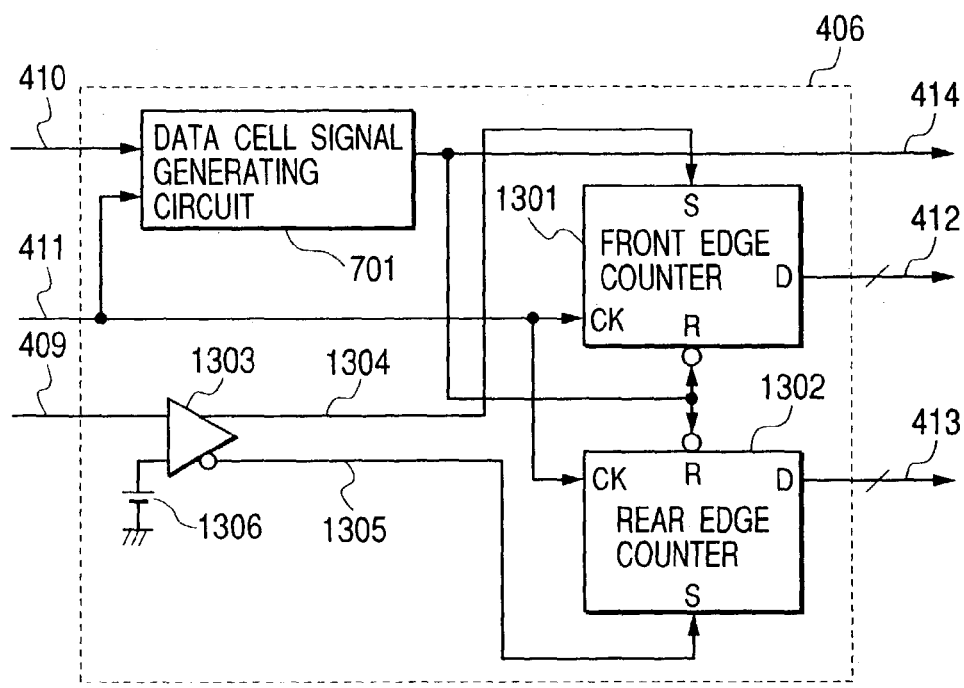
FIG. 15 shows a block diagram of another example of the data detector.

Another example of the detector will be described by referring to FIGS. 14 and 15. FIG. 14 shows the relationship between a readout signal and an edge detection signal. FIG. 15 shows the block diagram of an example of the data detector 406.

A readout signal waveform 409 is sliced by a half-value level 1306 of the maximum amplitude of the readout waveform to produce a pulse signal 1304 which rises at the front edge and falls at the rear edge. By using the pulse signal 1304 and the clock signal 411, the front- and rear-edge positions are detected. The readout signal 409 is supplied to one of the inputs of a comparator 1303, and a voltage corresponding to the half-value level 1306 is supplied to the other input. A positive polarity output of the comparator 1303 is fed to the set terminal of the counter 1301. The counter 1301 is reset by the data cell signal 414 as the pulse signal 1304 rises, and the counter outputs the value of the number of clocks counted from the start position of the data cell. Thus, the position of the front edge measured in clock units from the head of the data cell appears at an output 412 of the counter 1301. Similarly, the negative polarity output of the comparator 1303 is input to a set terminal of the counter 1302, and the value of the number of clocks counted from the start position of the data cell is finalized by the fall of the pulse signal 1304. Thus, the position of the rear edge measured in clock units from the head of the data cell appears at an output 413 of the counter 1302. The data about the front- and rear-edge positions thus outputted from the counters 1301 and 1302 is fed to the decoder 407, where it is converted into user bits, thereby obtaining the user data.

Yet another detection system will be described by referring to FIGS. 16 and 17. In the previous examples, since the detection clock frequency corresponds one to one to the specific intervals Δ, the clock frequency becomes higher than the frequency of repetition of the data cell signal. As the clock frequency becomes higher, the detection margin decreases because of circuit delay or pulse timing fluctuations caused by deviations in power source. Accordingly, the frequency of the timing signal used for detection has to be decreased. In the present embodiment, the edge position is detected in terms of changes in multi-value levels, as described based on a prior art example. In the present invention, however, the mark edge position varies in a wider range than in the conventional example. As a result, the detection dynamic range might be exceeded if it is attempted to detect the edge position at only specific timings. Therefore, in the present embodiment, the readout signal level is measured at multiple timings, and the edge position is detected by using the detection results. This way, the lack of dynamic range is overcome. This requires that a detection range D, which is determined by the dynamic range at a specific timing, be superposed on a detection range W of an adjoining timing.

Figure 16:
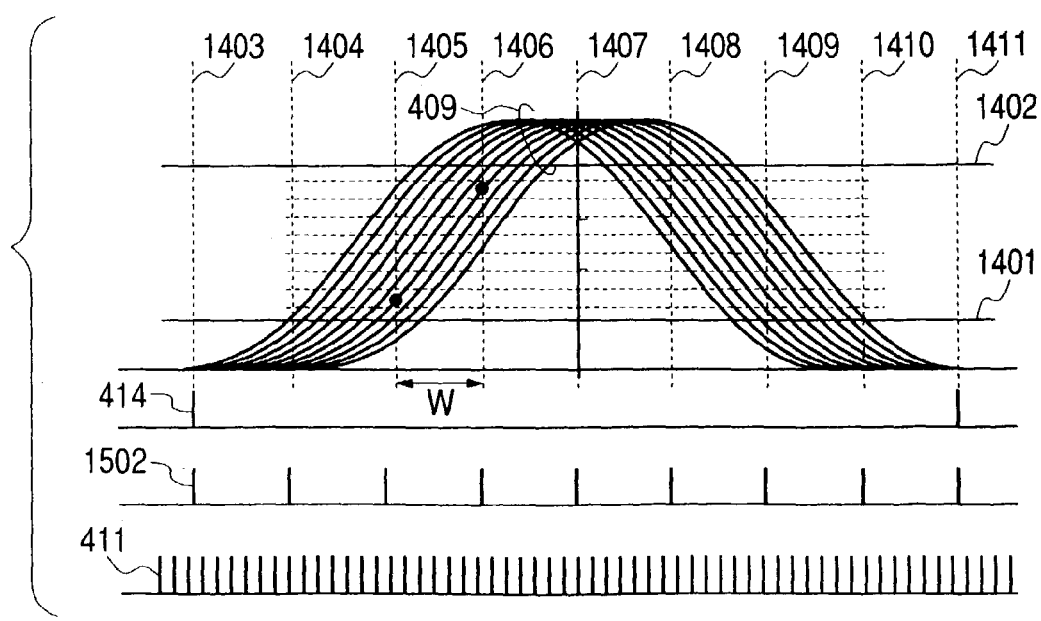
FIG. 16 illustrates the relationship between a clock signal and a sample pulse signal.

As shown in FIG. 16, a sample pulse signal 1502 is generated which is synchronized with the data cell signal 414 and whose period is an integer multiple of the repetition period of the clock signal 411. The repetition period of this sample pulse is chosen in the following manner. When a step response is observed as the spot passes an edge, there is a region in which the relationship between the edge position and the signal is linear. This region, which is between a minimum level 1401 and a maximum level 1402, indicates the detection dynamic range.

Figure 17A:
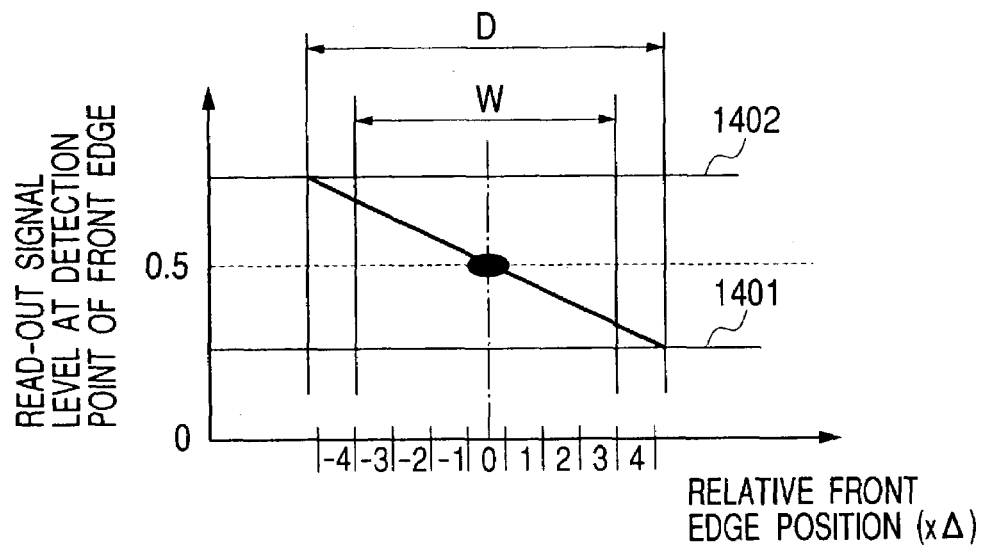
FIGS. 17(a) and 17(b) show the relationship between readout-signal levels and edge positions measured at specific timings.
Figure 17B:
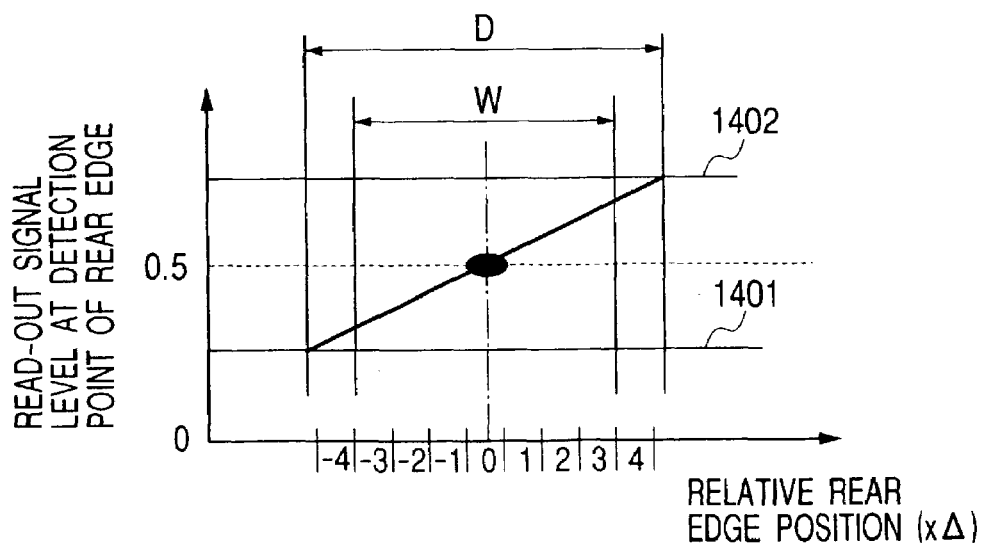

FIGS. 17(a) and 17(b) show the relationship between the level of the readout signal observed at a specific timing and the edge position. FIG. 17(a) relates to the front edge, while FIG. 17(b) relates to the rear edge. The range of the edge position corresponding to the dynamic range of the readout signal is indicated by D. When the edge detection range at a specific timing is W, the interval between this timing and the adjoining timing is also W. By making the detection range W smaller than D, which is determined by the dynamic range, the edge position can be identified from the readout signal by using the linear characteristic at a certain timing, no matter where the edge is positioned.

Specifically, in FIG. 17(a), if the readout signal exceeds the minimum level 1401 at a specific timing, it can be known that the front edge is within the detection range. Accordingly, the edge position can be determined based on the readout signal by using a function indicating the linear relationship between the readout signal level and the edge position. By creating a table that shows the range in which the readout signal can exhibit this function at specific intervals Δ, the front-edge position can be detected in units of the specific interval. Similarly, in FIG. 17(b), if the readout signal at a specific timing is smaller than the maximum level 1402, it can be known that the rear edge is within the detection range. Accordingly, the edge position can be determined based on the readout signal by using the function indicating the linear relationship between the readout signal level and the edge position. By creating a table that shows the range in which the readout signal can exhibit this function at specific intervals Δ, the rear-edge position can be detected in units of the specific interval.

Figure 18:
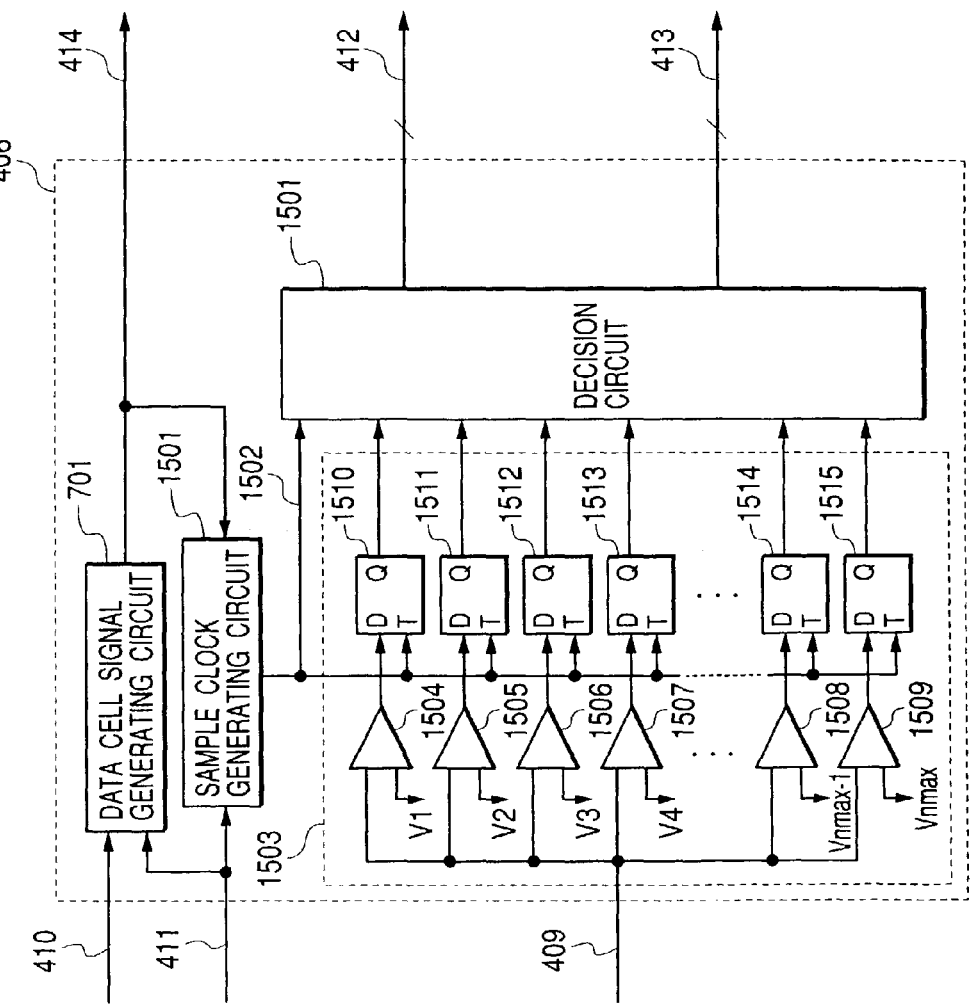
FIG. 18 shows a block diagram of another example of the data detector.
Figure 19:
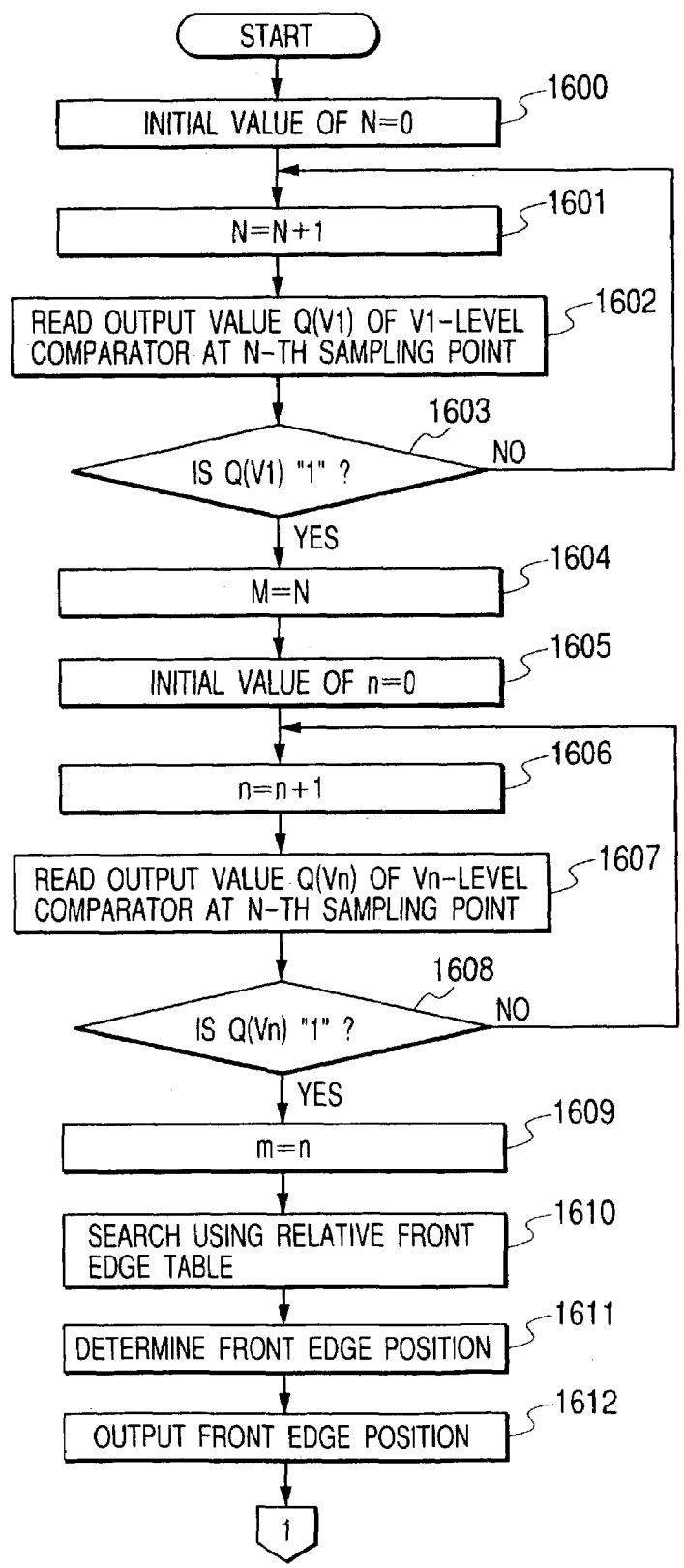
FIG. 19 shows a flowchart of the processes performed by a decision circuit provided in the data detector.
Figure 20:
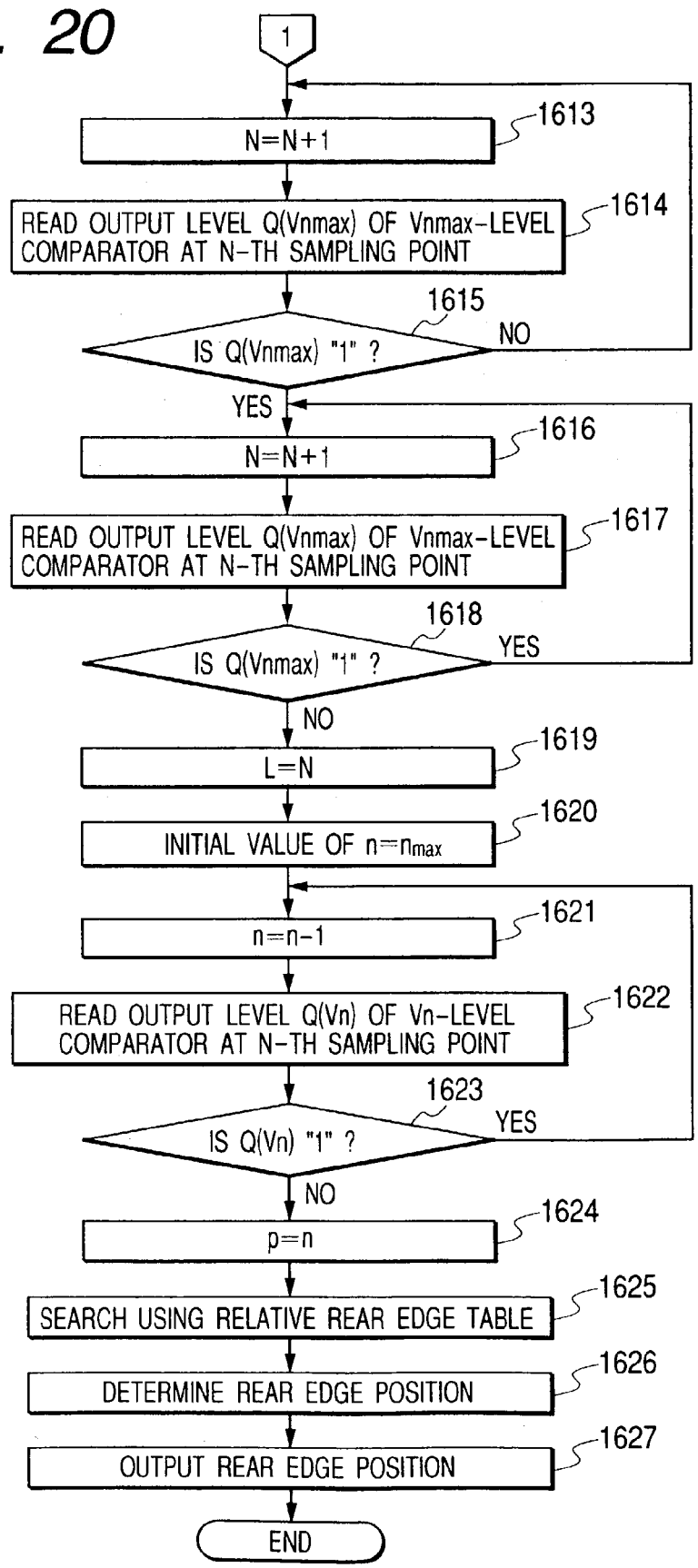
FIG. 20 shows another flowchart of the processes performed by the decision circuit provided in the data detector.

FIG. 18 shows the block diagram of the data detector 406 according to the present embodiment. FIGS. 19 and 20 show flow charts of the process performed in a decision circuit provided in the data detector 406.

The readout signal 409 is fed to comparators 1504, 1505, 1506, 1507, ..., 1508, 1509 having different thresholds. The comparators compare the input level with their respective threshold voltages, and output a "1" if the input level is larger than the threshold, and a "0" below the threshold. The output of each comparator is supplied to a flip-flop circuit 1510, 1511, 1512, 1513, ..., 1514, or 1515, and acquired by each flip-flop circuit at the timing of the sample pulse 1502 when the value is finalized. The output of each flip-flop circuit is coupled to a decision circuit 1501, where the process as shown in FIGS. 19 and 20 is performed. As a result, the front- and rear-edge position signals 412 and 413 are output from the decision circuit 1501 for each data cell.

Hereafter, the process flow will be described in detail by referring to FIGS. 19 and 20. In step 1600, the value of the counter, which indicates the number of a sampling point, is set at zero. Next, in step 1601, the value of the counter is incremented by one. In step 1602, the output Q(V1) of the V1 comparator is monitored at the detection timing of the number indicated by the counter. In step 1603, it is determined, based on the output Q(V1) of the comparator, whether the readout signal has exceeded V1. If not, step 1601 is repeated until the readout signal exceeds V1. If the readout signal exceeds V1, the process goes to step 1604, where the value of the counter at the time when V1 was exceeded is stored as M.

Then, in order to detect the sample value at the Mth detection timing, the outputs of the comparators with their individual levels are monitored. Initially, in step 1605, the initial value of the counter designating the number of the comparator is set at zero. Next, in step 1606, the value of the counter is updated one by one. In step 1607, the output of the comparator of the number indicated by the counter is acquired. In step 1608, it is determined whether or not the output of the comparator is one. If not, step 1606 is repeated and the number of the counter is increased until the output becomes one. In step 1609, the value of the counter producing the output of one is recorded in the counter as m. In step 1610, a relative front-edge position is searched by using the value of m and a relative front-edge table. In step 1611, the front-edge position number, which is allotted in each unit of specific interval Δ in the data cell, is obtained based on a pair of the relative front-edge position obtained in step 1610 and the value M obtained in step 1604. In step 1612, the front-edge position number is outputted as the front-edge position.

The process then goes to steps for detecting the rear-edge position. In step 1613, the value of the counter indicating the number of the sampling timing is updated by one. In step 1614, the output $Q(Vn_{max})$ of the $Vn_{max}$-value comparator is monitored at the detection timing indicated by the value of the counter. In step 1615, it is determined, based on the output $Q(Vn_{max})$ of the comparator, whether or not the readout signal has exceeded $Vn_{max}$. If not, step 1613 is repeated until the readout signal exceeds $Vn_{max}$. If it does, the process goes to step 1616 to detect the timing at which the readout signal begins to fall from the saturation level. In step 1616, the value of the counter indicating the number of the sampling timing is updated by one. In step 1617, the output $Q(Vn_{max})$ of the $Vn_{max}$-value comparator is monitored at the detection timing of the number indicated by the value of the counter. In step 1618, it is determined, based on the output $Q(Vn_{max})$ of the comparator, whether or not the readout signal has dropped below $Vn_{max}$. If not, step 1616 is repeated until the readout signal drops below $Vn_{max}$. When it does, the comparison of the sample values is stopped and the process goes to step 1619, where the value of the counter when the readout signal dropped below $Vn_{max}$ is stored as L.

Then, in order to detect the sample value at the Lth detection timing, the outputs of the comparators with their individual levels are monitored. Initially, in step 1620, the initial value of the counter designating the number of a comparator is set at $n_{max}$. Next, in step 1621, the value of the counter is decreased one by one. In step 1622, the output Q(Vn) of the comparator of the number indicated by the counter is acquired. In step 1623, it is determined whether or not the output of the comparator is zero. If not, step 1621 is repeated and the number of the counter is decreased until the output becomes zero. In step 1624, the value of the counter producing the output of zero is recorded in the counter as p. In step 1625, a relative rear-edge position is searched by using the value of p and a relative rear-edge table. In step 1626, the rear-edge position number, which is allotted in each unit of specific interval Δ in the data cell, is obtained based on a combination of the relative rear-edge position obtained in step 1625 and the sampling timing L obtained in step 1619. In step 1627, the rear-edge position number is outputted as the rear-edge position.

Referring to FIG. 6, an equalizer circuit may be inserted after the pre-amplifier 404 in order to perform a signal processing on the waveform read from the disc. In this case, the minimum mark can be made even shorter, so that the mutual interference from the front and rear edges can be decreased, and therefore the signal amplitude can be increased, even if the readout signal level from the mark decreases. Furthermore, because the waveform after equalization has reduced levels of interference from the front and rear edges, the waveform can be treated in the same way as is the readout signal that has been described in the previous embodiments of the invention. Thus, when the equalizing process is performed, the minimum mark length can be made shorter than that without such a process. This enables more information to be put in a data cell when the data cell length is fixed.

Thus, in accordance with the invention, in a method for recording information by varying the length and position of marks by varying their front and rear edges at specific intervals, the density of the marks can be increased without narrowing the intervals of the edge position variation and without being influenced by the detection dynamic range. The invention enables data to be read with the same detection margin as that in the prior art, so that the circuit operation during detection can be stabilized.

What is claimed is:

1. An information recording medium comprising marks formed in a data recording area provided along tracks, the marks storing data, wherein the data recording area comprises a plurality of data cells each having a mark formed therein, wherein a length of the mark varies between a minimum length mark and a maximum length mark with an edge position at a front or rear of the mark fixed and the mark in the data cell represents data by a pair of front- and rear-edge positions that are allocated such that a plurality of the minimum-length marks with different center locations can be disposed, and the fixed edge position is spaced apart from a cell edge by at least one half the minimum mark length.

2. The information recording medium according to claim 1, wherein the data cell is divided into a plurality of partial areas with a predetermined length in the direction of the tracks, wherein the front- and rear-edge positions are varied in units of the predetermined length.

3. The information recording medium according to claim 1, wherein the mark has different optical characteristics from those of the other parts within the data cell.

4. The information-recording medium according to claim 1, wherein there are multiple combinations of the front- and rear-edge positions based on a mark with a minimum mark length.

5. The information recording medium according to claim 1, wherein the data cell is divided into a plurality of partial areas, each of said areas having a predetermined length in the direction of the tracks, wherein the front- and rear-edge positions are varied in units of the predetermined length and each of the front- and rear-edge positions are determined to be in one of said partial areas.

6. The information recording medium according to claim 5, wherein the data cells are separated by break points and the plurality of partial areas are determined with respect to the break points.

7. The information recording medium according to claim 1, wherein the data cell is divided into a plurality of partial areas, each of said areas having a predetermined length in the direction of the tracks, wherein the front- and rear-edge positions are varied in units of the predetermined length and each of the front- and rear-edge positions are determined to be in one of said partial areas.

8. The information recording medium according to claim 5, wherein the data cells are separated by break points and the plurality of partial areas are determined with respect to the break points.

9. An information recording medium comprising marks formed in a data recording area provided along tracks, the marks staring data, wherein the data recording area comprises a plurality of data cells each having a mark formed therein, wherein a length of the mark varies between a minimum length mark and a maximum length mark with an edge position at a front or rear of the mark fixed and the mark is set to represent data by a pair of front- and rear-edge positions that are allocated such that a plurality of minimum-length marks with different center positions can be disposed, whereby different data can be represented by the plurality of the minimum-length marks with different center locations in each data cell, and one of the fixed edge positions is spaced apart from an adjacent cell edge by at least one half of the minimum mark length.

10. The information-recording medium according to claim 9, wherein the data cell is divided into a plurality of partial areas with a predetermined length in the direction of the tracks such that a plurality of minimum mark lengths with different center locations can be disposed in each data cell, wherein the mark can be allocated a plurality of mark lengths that vary in units of the predetermined length.

11. The information recording medium according to claim 9, wherein the mark has different optical characteristics from those of the other parts within the data cell.

12. The information recording medium according to claim 9, wherein there are multiple mark positions in the data cell based on a mark with a minimum mark length.

13. An information recording apparatus for recording data in a disc recording medium by forming a mark in each of a plurality of data cells provided along tracks on the disc recording medium, a length of the mark varies between a minimum length mark and a maximum length mark with an edge position at the front or rear of the mark fixed, and the fixed edge position is spaced apart from a cell edge by at least one half the minimum mark length, the apparatus comprising:
  a light source;
  optics for forming a small spot on the surface of the recording medium by converging a light flux irradiated by the light source;
  an encoder for converting the mark for user data in the data cell into a pair of front- and rear-edge positions that are allocated such that a plurality of the minimum-length marks with different center locations can be disposed;
  a modulator for generating a write waveform based on the information about the front- and rear-edge positions outputted by the encoder; and
  a laser drive circuit for driving the light source in accordance with the write waveform outputted by the modulator.

14. The information recording apparatus according to claim 13, wherein the encoder comprises:
  means for generating a pulse signal by using a clock signal which is generated at break points between the cells in accordance with the rotation of the disc recording medium at such timings that each of the data cells is divided into a predetermined number of areas at equal intervals in the direction of the tracks, the pulse signal rising at the front-edge position and falling at the rear-edge position; and means for generating the write waveform based on the pulse signal.

15. An information reading apparatus for reading information from a disc information recording medium by detecting a mark formed in each of a plurality of data cells provided along the tracks of the disc recording medium, a length of the mark varies between a minimum length mark and a maximum length mark with an edge position at a front or rear of the mark fixed, and the fixed edge position is spaced apart from a cell edge by at least one half the minimum mark length and the apparatus comprising:

optics for irradiating the disc recording medium with an optical spot;

a photodetector for detecting light reflected by the disc recording medium;

a front/rear edge detection block for detecting, by processing a readout signal outputted by the photodetector, the front- and rear-edge positions of the mark in each data cell tat are allocated such that a plurality of the minimum-length marks with different center locations can be disposed; and a decoder for convening a pair of the front- and rear-edge positions of the mark into user data.

16. The information reading apparatus according to claim 15, wherein the front/rear edge detection block comprises:

a data cell signal generating circuit for generating a data cell signal indicating the start point of each data cell;

a circuit for generating a sample signal at a plurality of predetermined timings based on the data cell signal;

a table storing the relationship between the readout-signal intensity and the front- or rear-edge position for each sample signal;

means for outputting a corresponding front-edge position by referring to the table when the readout signal sampled by the sample signal is within a predetermined intensity range in a phase in which the readout signal increases with time; and means for outputting a corresponding rear-edge position by referring to the table when the readout signal sampled by the sample signal is within the predetermined intensity range in a phase in which the readout signal decreases with time.

17. The information reading apparatus according to claim 16, wherein the predetermined intensity range of the readout signal is such that the readout signal and the edge positions exhibit a linear relationship.

18. The information reading apparatus according to claim 17, wherein the sample signal timings are such that readout signals sampled by any two adjacent sample signals are within the predetermined intensity range.

* * * * *